United States Patent [19]

Okamura

[11] 4,019,764
[45] Apr. 26, 1977

[54] CLAMPING DEVICE ADAPTED TO CLAMP PLATE-LIKE MEMBERS

[75] Inventor: Kouichi Okamura, Fukuoka, Japan

[73] Assignee: Matsushita Electric Industrial Co., Ltd., Japan

[22] Filed: Dec. 3, 1975

[21] Appl. No.: 637,301

[30] Foreign Application Priority Data

| Dec. 10, 1974 | Japan | 49-96369 |
| Feb. 17, 1975 | Japan | 50-22143 |
| Feb. 17, 1975 | Japan | 50-24074 |
| Feb. 17, 1975 | Japan | 50-24094 |

[52] U.S. Cl. .............................. 292/288; 229/45 R
[51] Int. Cl.² ...................................... E05C 19/18
[58] Field of Search ............. 292/288, 282; 229/45

[56] References Cited
UNITED STATES PATENTS

| 3,545,801 | 12/1970 | Barsness | 292/288 |
| 3,875,843 | 4/1975 | Maeda et al. | 229/45 X |

Primary Examiner—James C. Mitchell
Attorney, Agent, or Firm—Burgess Ryan and Wayne

[57] ABSTRACT

A clamping device especially adapted to detachably and easily clamp plate-like members such as corrugated cardboard. The clamping device comprises two clamping members with a U-shaped channel for receiving therein the plate-like members to be clamped, a flexible member interconnecting the two clamping members, and an intermediate member formed integrally with the two clamping members and adapted to be placed between the two clamping members to extend the flexible interconnecting member to the locking position. The above members are formed integrally by forming suitable flexible plastic. When the clamping device is inserted into the clamping holes formed through the plate-like members to be clamped, it is bent along the flexible interconnecting member in such a way that the U-shaped channels of the clamping members receive therein the plate-like members. Thereafter, the intermediate member is forced into the position between the two clamping members so that the interconnecting member may be extended and consequently the edges of the clamping holes may be firmly clamped by the clamping members.

7 Claims, 21 Drawing Figures

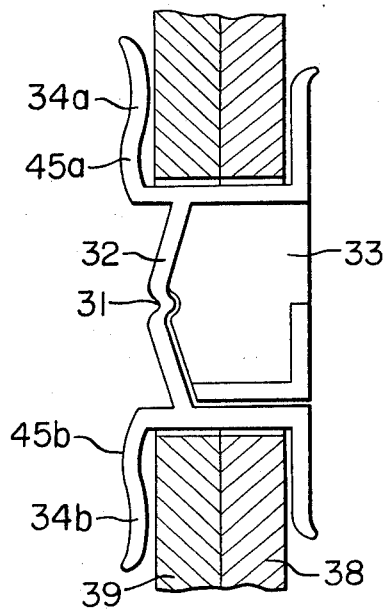
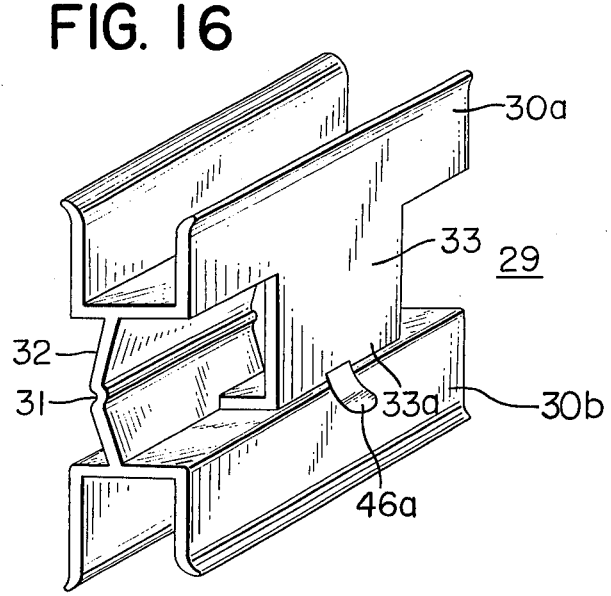
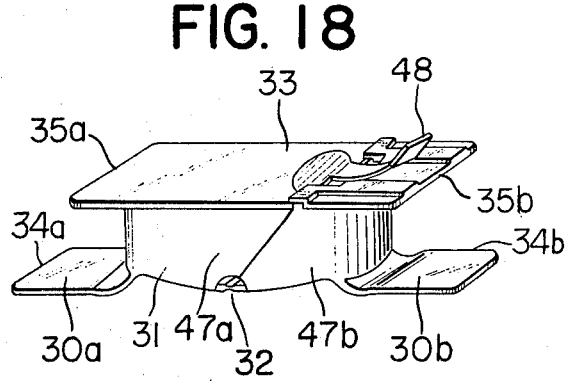
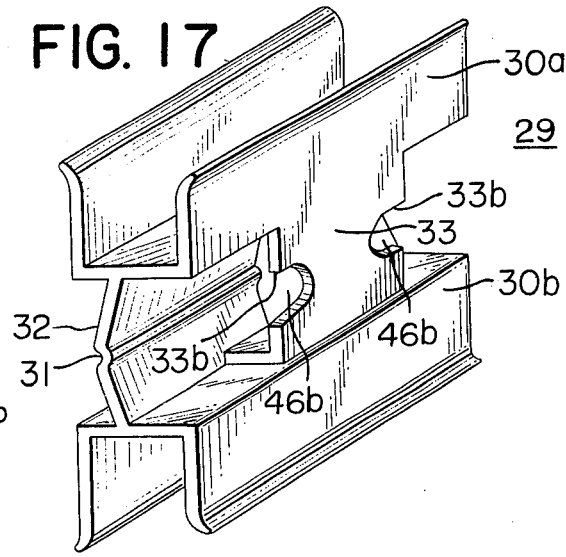
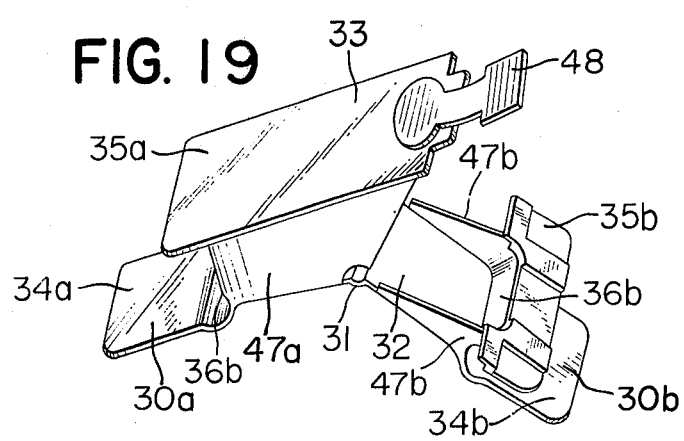

CLAMPING DEVICE ADAPTED TO CLAMP PLATE-LIKE MEMBERS

BACKGROUND OF THE INVENTION

The present invention relates to generally a clamping device to clamp plate-like members, and more particularly a clamping device for use in clamping together an inner packing box and an outer packing box or a plurality of packing boxes.

In general, packing bands or belts made of steel or synthetic resin have been used for binding the packing boxes. Therefore there is a fear that the packing bands or belts may be loosened or cut off during shipment. When the packing bands or belts are cut off, they cannot be reused.

There has been devised and demonstrated a packing method in which inner and outer boxes are bound together by means of clamping or locking devices attached to the peripheries of the boxes. However, when the clamping or locking devices are broken, the inner and outer boxes cannot be bound together even though they may be used.

There has been also proposed a two-piece shipping clamping device of the type comprising a male and female members. The male member has a large-diameter cylindrical portion with the closed bottom and the flange extending outwardly from the periphery of the open end and a small-diameter cylindrical portion extended from the bottom of the large-diameter cylindrical portion coaxially thereof. At the open end of the small-diameter cylindrical section are attached engaging projections which are angularly spaced apart by 180°. The female member has cylindrical barrel or drawn portion for receiving therein the small-diameter cylindrical portion of the male member, and a flange extending outwardly from the bottom of the cylindrical barrel or drawn portion. A hole with diametrically spaced apart recesses for permitting the insertion of the engaging projections is formed through the bottom of the cylindrical barrel portion of the female member. In packing, the barrel portion of the female member is fitted into the hold formed through the side wall of an inner packing box, and the large-diameter cylindrical portion of the male member is fitted into the hole formed through the side wall of an outer packing box in alignment with the hole of the inner box, in such a manner that the small-diameter cylindrical portion of the male member is fitted into the cylindrical barrel portion of the female member and the engaging projections are inserted through the recesses of the hole formed through the bottom of the female member. Thereafter, one holds a knob formed within the large-diameter cylindrical portion of the male member to rotate the latter through 90°, thereby clamping together the inner and outer packing boxes. With the use of such clamping devices having male and female members, the packaging may be facilitated, but there are defects in that that the clamping device comprises two pieces and they are very complex in construction. Therefore, two kinds of dies or molds must be prepared with the result of an increased cost.

SUMMARY OF THE INVENTON:

One of the objects of the present invention is to provide a clamping device for clamping plate-like members such as corrugated cardboards which device is simple to manufacture and to use.

Another object of the present invention is to provide a clamping device comprising a pair of clamping members having a U-shaped cross sectional configuration and interconnected by a flexible interconnecting member and an intermediate member formed integrally with either of the pair of clamping members and adapted to be placed therebetween to extend the flexible member.

More particularly, the present invention provides a clamping device for clamping plate-like members comprising a pair of clamping members having a substantially U-shaped cross sectional configuration, a flexible interconnecting member interconnecting the bottoms of the clamping members, and an intermediate member formed integrally with either of the pair of clamping members or the interconnecting member and adapted to be placed between the pair of clamping members to extend the flexible interconnecting member in excess of 180° to the locking position in the direction opposite to the direction in which the flexible interconnecting member is permitted to bend, whereby the clamping device may be securely held in the clamping position.

The clamping device in accordance with the present invention may be used for clamping, for instance, an outer box and an inner box. More particularly, the clamping device is bent along the flexible interconnecting member, and the clamping members are inserted into the clamping holes formed through the side walls of the outer and inner boxes and coaxially aligned in such a way that the U-shaped channels of the clamping members may be fitted over the edge portions of the clamping holes. Thereafter, the intermediate member is forced between the clamping members so that the flexible interconnecting member is extended, causing the clamping members to rotate and further grip the edge portions. The flexible member is extended to the locking position in excess of 180° in the direction opposite to the direction in which the flexible interconnecting member is permitted to bend so that the clamping device may be securely held in position and may firmly clamp the side walls of the outer and inner boxes.

BRIEF DESCRIPTION OF THE DRAWING:

FIG. 15 is a side view of the clamping device shown in FIG. 13 placed in the clamping position in the clamping holes;

FIGS. 16 and 17 are perspective view of a fifth and a sixth embodiments, respectively, of the present invention; and FIGS. 18 and 19 are perspective views of a seventh embodiment of the present invention.

Same reference numerals are used to designate similar parts in FIGS. 4 through 19.

Figure 1:
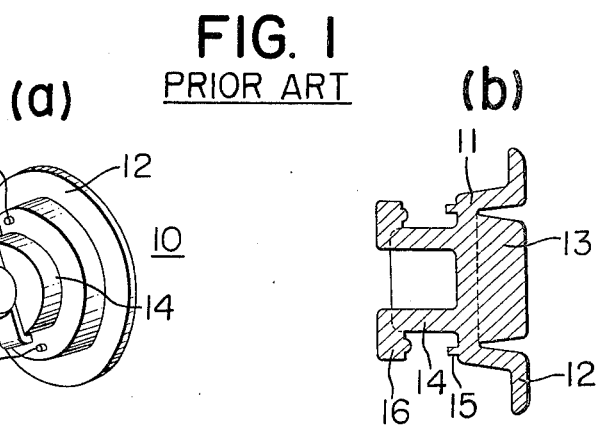
FIG. 1a is a perspective view of a male member of a conventional shipping clamping device.
FIG. 1b is a sectional view thereof.
Figure 2:
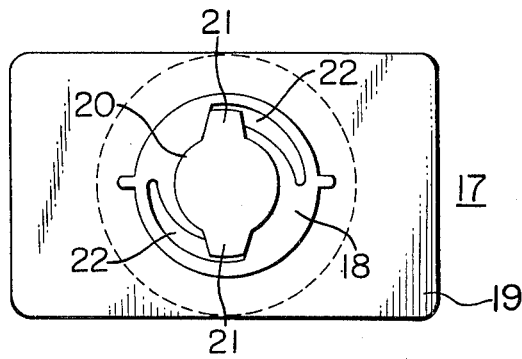
FIG. 2 is a top view of a female member.
Figure 3:
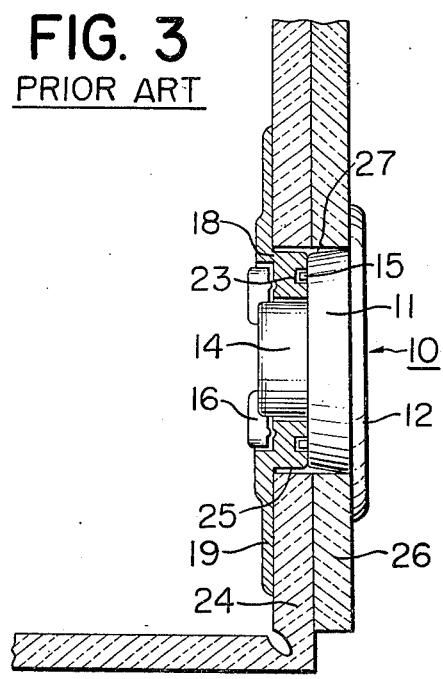
FIG. 3 is a side view, partly in section, of the conventional shipping clamping device used to clamp an inner packing box with an outer packing box.
Figure 4:
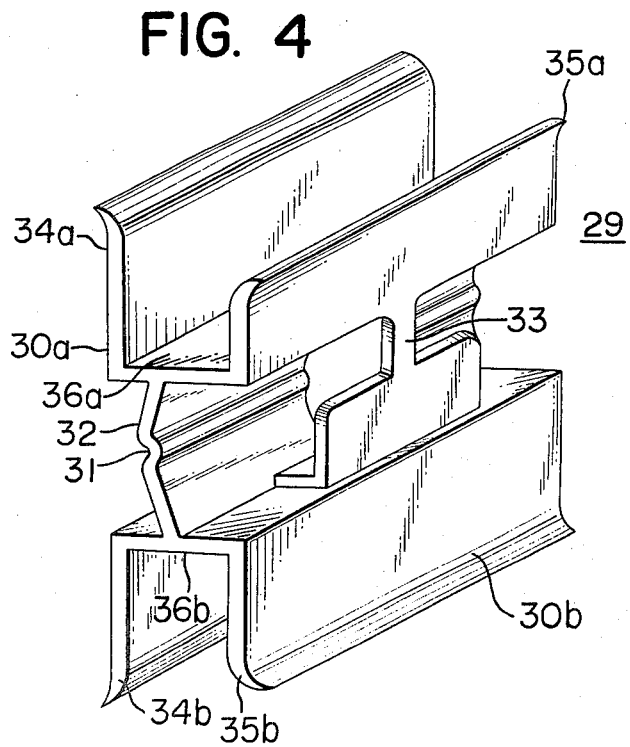
FIG. 4 is a perspective view of a first embodiment of a clamping device in accordance with the present invention.

DESCRIPTION OF THE PREFERRED EMBODIMENTS:

Prior Art, FIGS. 1, 2 and 3

Prior to the description of the preferred embodiments of the present invention, the conventional clamping device used in packaging will be described briefly in order to more specifically point out the defects thereof. The conventional two-piece clamping device comprises, in general, a male member generally indicated by the reference numeral 10 in FIG. 1 and a female member generally indicated by the reference numeral 17 in FIG. 2. The male member 10 comprises a large-diameter cylinder section 11 with a flange 12 and a knob 13 extending outwardly from the bottom of the cylinder section 11 and a small-diameter cylindrical section 14 formed integral with the large-diameter cylindrical section 11 in coaxial relation therewith. At the outer bottom or the step between the large-diameter cylinder section 11 and the small-diameter cylindrical section 14 are formed projections or pins 15, and at the top of the small-diameter cylinder section 14 are formed engaging members 16. As shown in FIG. 2, the female member 17 comprises a disk portion 18 with a flange 19 whose thickness is smaller than that of the disk portion 18. The disk portion 18 has an opening 20 into which is fitted the small-diameter cylindrical section 14 of the male member 10, and the opening 20 has radially outwardly extending recesses 21 into which are fitted the engaging members 16 of the small-diameter cylindrical section 14. Arcuate grooves 22 into which are fitted the engaging members 16 are formed in the major surface of the disk portion 18 coplanar with the flange 19 in such a way that the radius of each of the grooves 22 is increased gradually as they are away from the recesses 21. Grooves 23 (See FIG. 3) into which are fitted the projections or pins 15 of the male member 10 are formed in the other major surface of the disk portion 18.

Next referrring to FIG. 3, the method for fastening an inner packing box 24 and an outer packing box 26 with the two-piece shipping fastening device with the above construction will be described. Holes 25 and 27 are formed through the boxes 24 and 26, respectively, in coaxial alignment with each other. The disk portion 18 of the female member 17 is fitted into the hole 25 of the inner box 24 with the flange 19 closely pressed against the inner wall surface of the inner box 24, and the small-diameter cylindrical portion 14 and the engaging members 16 of the male member 10 are fitted into the opening 20 and the recesses 21, respectively, when the male member 10 is fitted into the hole 27 of the outer box 26. Thereafter, an operator holds the knob 13 and rotates the male member 10 in the clockwise direction so that the engaging members 16 of the male member 10 are forced to move through the arcuate grooves 22 of the female member 17. Thus, the male and female members 10 and 17 are securely interlocked with each other whereby the inner and outer boxes 24 and 26 are fastened to each other.

Since both the male and female members 10 and 17 are complex in construction, they are generally formed by casting or molding so that two pairs of molds one for the male member 10 and the other for the female member 17 must be formed.

First Embodiment, FIGS. 4 through 7

In FIGS. 4 through 7, there is shown a first embodiment of a one-piece clamping device for clamping plate-like members in accordance with the present invention. The one-piece clamping device generally indicated by the reference numeral 29 comprises a pair of upper and lower clamping members 30a and 30b having a U-shaped cross sectional configuration, an interconnecting member 32 interconnecting the clamping members 30a and 30 b and including a hinge portion 31, and an intermediate member 33 adapted to be placed between the clamping members 30a and 30b when the interconnecting member 32 is extended.

The upper edges of the side walls 34a, 34b, 35a and 35b of the clamping members 30a and 30b are slightly curved outwardly while the bottoms 36a and 36b are flat. The interconnecting member 32 interconnects between the flat bottoms 36a and 36b, and the hinge portion 31 is formed along the center line of the interconnecting member 32. The intermediate member 33 has a first portion that extends at right angles to both the bottom 36a of the clamping member 30a and the upper half of the interconnecting member 32 and is adapted to be placed between the clamping members 30a and 30b when the interconnecting member 32 is extended and bowed outward away from the intermediate member.

Figure 5:
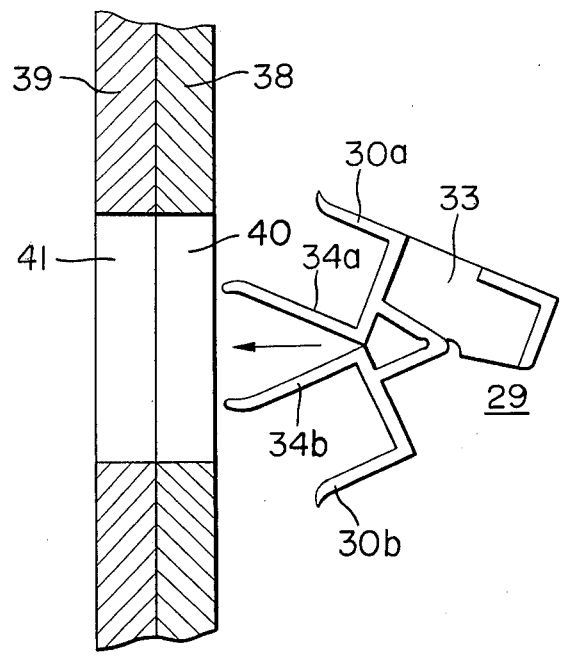
FIG. 5 is a view used for the explanation of the method for inserting the clamping device into the clamping holes formed through the side walls of the outer and inner packing boxes.
Figure 6:
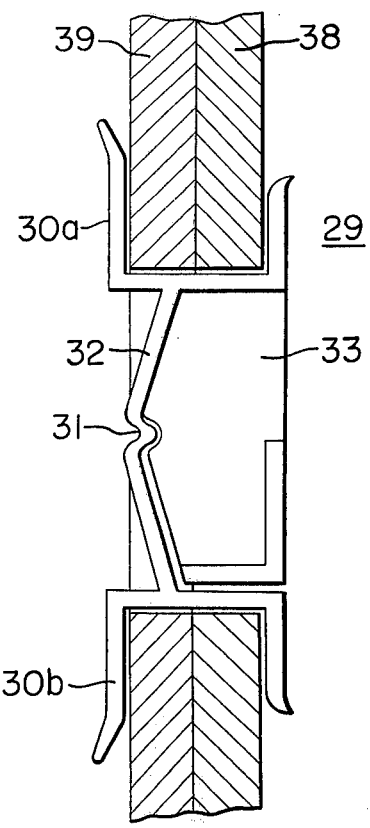
FIG. 6 is a sectional view of the clamping device securely placed in the clamping position in the clamping openings.
Figure 7:
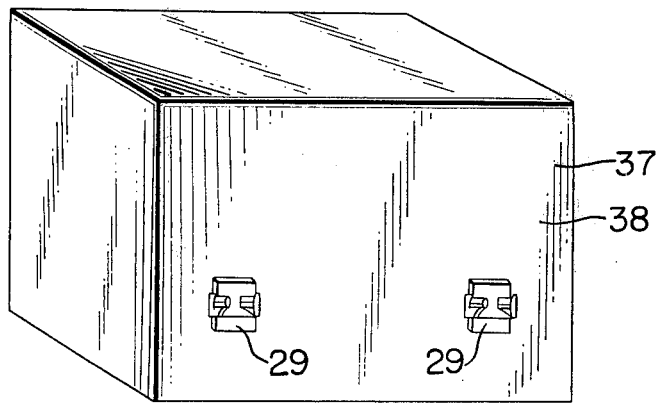
FIG. 7 is a perspective view of the outer packing box clamped to the inner packing box with the clamping devices in accordance with the present invention.

Next referring particularly to FIGS. 5, 6 and 7, the method for clamping an outer box 38 and an inner box 39 of a package 37 with the clamping device with the above construction will be described. First, as shown in FIG. 5, the clamping device 29 is bent along the hinge portion 31 so that the upper edges of the side walls 34a and 34b of the clamping members 30a and 30b may be inserted into clamping holes 40 and 41 formed through the side walls of the outer and inner boxes 38 and 39, respectively, and coaxially aligned with each other. Thereafter, the intermediate member 33 is forced between the upper and lower clamping members 30a and 30b to extend the interconnecting member 32 so that the upper and lower clamping members 30a and 30b are extended upwardly and downwardly, respectively, to receive and clamp the walls of the outer and inner boxes 38 and 39 in the U-shaped channels thereof as shown in FIG. 6 and 7. The intermediate member 33 is held in a stable position, and even when the outer box 38 is lifted so that the forces act upon the bottoms 36a and 36b of the clamping members 30a and 30b in the directions in which the clamping members 30a and 30b are to move toward each other, the clamping device 29 may be securely held in position because the intermediate member 33 is interposed between the upper and lower clamping members 30a and 30 b and the upper and lower halves of the interconnecting member 32 are bent in excess of 180° in the direction opposite to the direction in which they may be bent along the hinge portion toward each other as shown in FIG. 5. The forces acting on the clamping device 29 in the lateral direction thereof are received by the upper and lower clamping members 30a and 30b and the interconnecting member 32 therebetween, but the intermediate member 33 receives no force. However, the intermediate member 33 serves to hold the interconnecting member 32 in the extended or locking position. Therefore, even if the forces are applied to the outer and inner boxes 38 and 39 from any direction, the clamping device 29 may firmly clamp them together.

Figure 8:
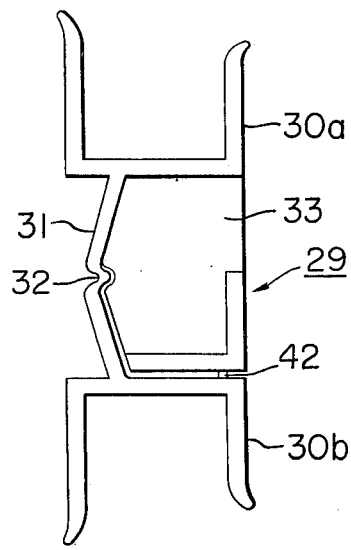
FIG. 8 is a side view of a second embodiment of the present invention.
Figure 9:
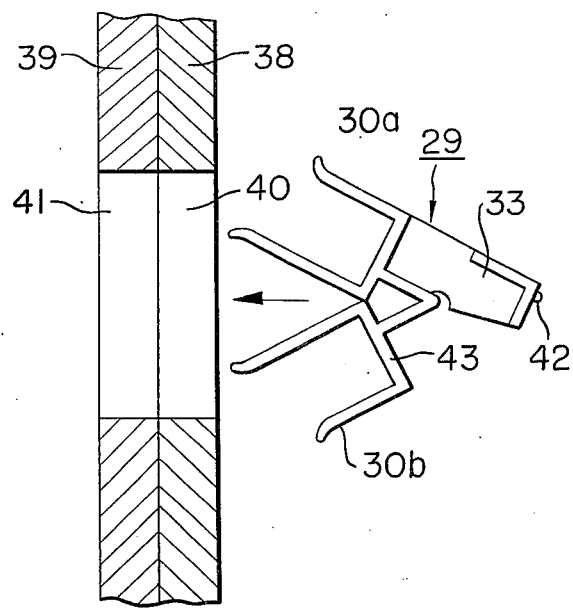
FIG. 9 is a view used for the explanation of the method for inserting the clamping device shown in FIG. 8 into the clamping holes of the outer and inner packing boxes to be clamped together.
Figure 10:
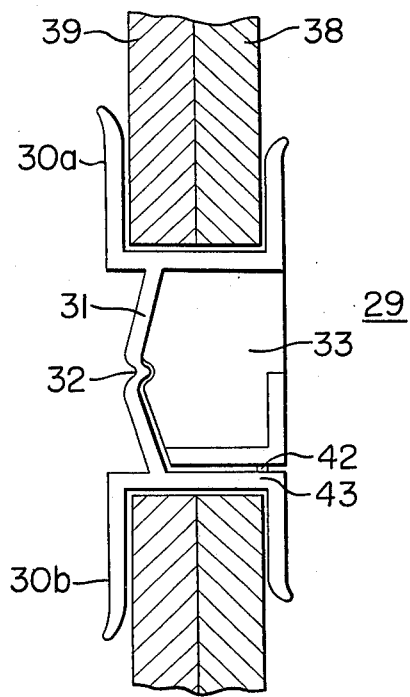
FIG. 10 is a sectional view of the clamping device shown in FIG. 8 placed in the clamping position in the clamping holes.

Second Embodiment, FIGS. 8, 9 and 10

The second embodiment shown in FIGS. 8 through 10 is substantially similar in construction to the first embodiment except that a projection 42 is extended from the lower surface of the intermediate member 33 and a recess 43 is formed in the outer surface of the bottom 36b of the lower clamping member 30b for receiving the projection 42 when the clamping device 29 is placed in the clamping position as best shown in FIG. 10 so that the intermediate member 33 may be more securely held in position between the upper and lower clamping members 30a and 30b. The method for clamping the plate-like members with this clamping device is same with that described above except that the projection 42 is received in the recess 43 when the upper and lower halves of the interconnecting member 32 are extended to the locking position as best shown in FIG. 10.

Figure 11:
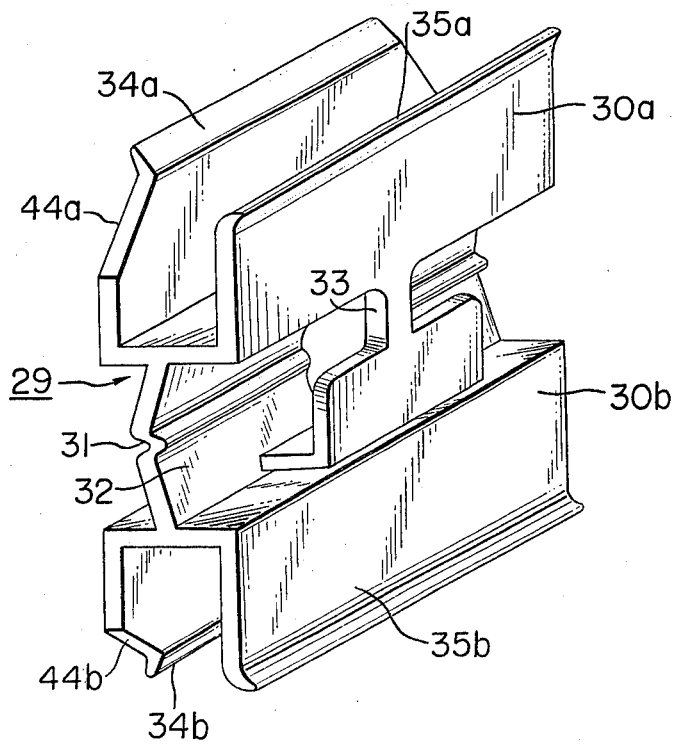
FIG. 11 is a perspective view of a third embodiment of the present invention.

Third Embodiment, FIGS. 11 and 12

The third embodiment shown in FIGS. 11 and 12 is substantially similar in construction to the first embodiment except that the upper corners 44a and 44b of one side wall 34a of each of the upper and lower clamping members 30a and 30b are cut off at angles as best shown in FIG. 11 so that the upper side may be shorter than the base. Therefore the insertion of these side walls into the clamping openings 40 and 41 may be much facilitated.

Figure 12A:
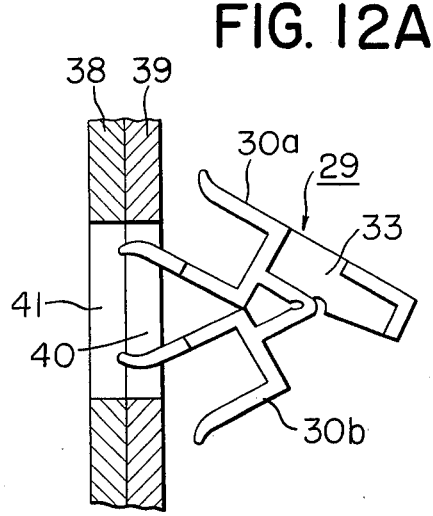
FIGS. 12A and 12B are views used for the explanation of the method for inserting the clamping device shown in FIG. 11 into the clamping holes formed through the side walls of the outer and inner packing boxes to be clamped together.
Figure 12B:
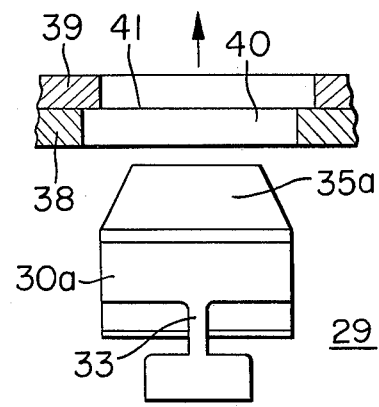

As shown in FIGS. 12A and 12B, even when the openings 40 and 41 of the outer and inner boxes 38 and 39 are not coaxially aligned, the side walls 34a and 34b of the clamping members 30a and 30b may be easily inserted into the openings 40 and 41 and may serve to align them.

Figure 13:
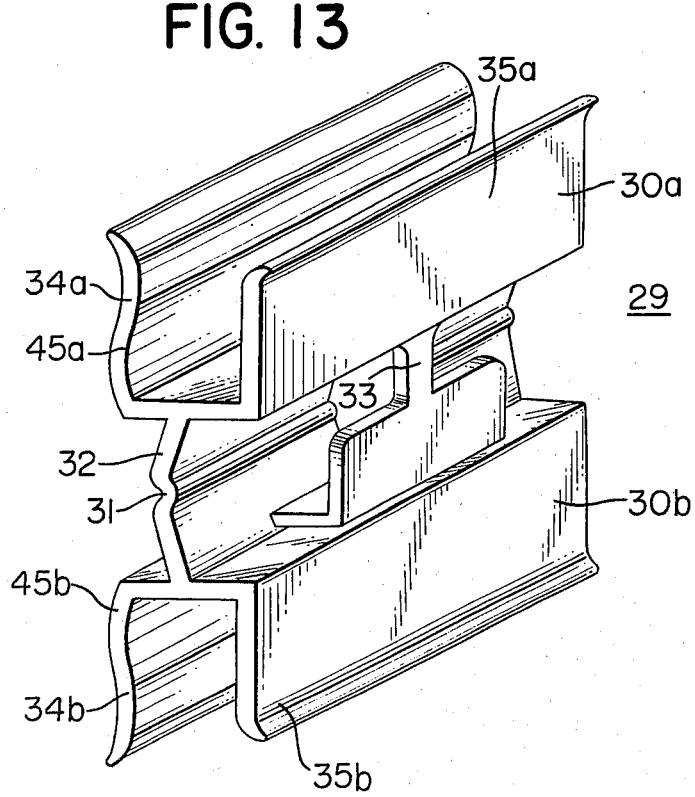
FIG. 13 is a perspective view of a fourth embodiment of the present invention.
Figure 14:
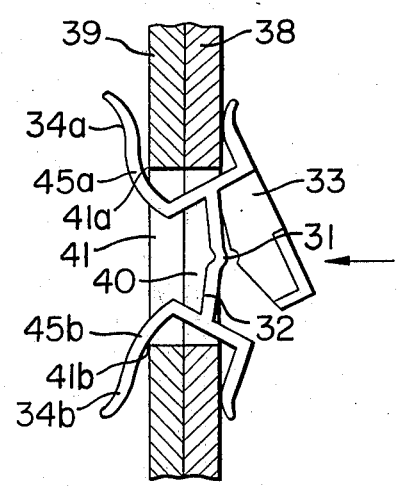
FIG. 14 is a view used for the explanation of the method for inserting the clamping device shown in FIG. 13 into the clamping holes formed through the side walls of the outer and inner packing boxes to be clamped together.

Fourth Embodiment, FIGS. 13, 14 and 15

The fourth embodiment shown in FIGS. 13, 14 and 15 is also substantially similar in construction to the first embodiment except that the side walls 34a and 34b of the upper and lower clamping members 30a and 30b are slightly bulged outwardly as best shown in FIGS. 14 and 15 at 45a and 45b in order to facilitate the insertion of the side walls 34a and 34b into the openings 40 and 41 of the outer and inner boxes 38 and 39. That is, when the inner side walls 34a and 34b of the clamping members 30a and 30b are inserted into the openings 40 and 41 and the intermediate member 33 is forced between the upper and lower clamping members 30a and 30b, as best shown in FIG. 14, so that the upper and lower clamping members 30a and 30b receive the side walls of the outer and inner boxes 38 and 39 in the U-shaped channels thereof, the bulged portions 45a and 45b may be spaced apart from the inner upper edge 41a and the inner lower edge 41b of the opening 41 of the inner box 39. Since the strong contact of the side walls 34a and 34b of the clamping members 30a and 30b with the inner upper edge 41a and the inner lower edge 41b of the opening 41 of the inner box 39 may be avoided, the insertion of the clamping device may be much facilitated.

Fifth and Sixth Embodiments, FIGS. 16 and 17

Both the fifth and sixth embodiments shown in FIGS. 16 and 17, respectively are also substantially similar in construction to the first embodiment except that in order to facilitate the removal of the clamping device 29 from its clamping position, the fifth embodiment provides a tongueshaped knob 46a which is extended from the lower portion of the intermediate member 33 while in the sixth embodiment, recesses 46b are formed in the intermediate member 33 for receiving the fingers of an operator. Therefore, even when the forces are acting in such a direction that the upper and lower clamping members 30a and 30b are forced to move toward each other, one may pull the tongue-shaped knob 46a or the intermediate member 33 by fingers or with a suitable tool such as pliers, forcing the intermediate member 33 out of the locking position between the upper and lower clamping members 30a and 30b. Therefore, the clamping device 29 may be easily removed from the outer and inner boxes.

Seventh Embodiment, FIGS. 18 and 19

The seventh embodiment shown in FIGS. 18 and 19 looks somewhat different from the first embodiment, but its construction is essentially similar to the first embodiment. The seventh embodiment may prevent the damages to the edges of the clamping openings 40 and 41 when the clamping device is inserted.

The seventh embodiment comprises the upper and lower clamping members 30a and 30b having a U-shaped cross sectional configuration, the interconnecting member 32 interconnecting the upper and lower clamping members 30a and 30b more particularly between the side walls 34a and 34b thereof and including the hinge portion 31, and the intermediate member 33 formed integrally with the side wall 35a of the upper clamping member 30a and adapted to engage with the side wall 35b, of the lower clamping member 30b. Side walls 47a are formed integrally with the upper half of the interconnecting member 32 above the hinge portion 31, the intermediate member 33 and the bottom 36a of the upper clamping member 30a. In like manner, side walls 47b are formed integrally with the lower half of the interconnecting member 32 and the bottom 36b of the lower clamping member 30b. The slanting sides of these side walls 47a and 47b are so designed and formed that they mate with each other as best shown in FIG. 18 when the clamping device is placed in the clamping position. Therefore, the side walls 47a and 47b and the bottoms 36a and 36b of the upper and lower clamping members 30a and 30b define a closed barrel portion which mates with the clamping openings 40 and 41 of the outer and inner boxes 38 and 39. Unlike the first through sixth embodiments, the barrel partion contacts with all sides of the clamping openings so that even when the forces are exerted to the outer and inner boxes in any directions, tending to cause the clamping openings to move away from each other, the stress concentration at the sides of the clamping openings may be positively prevented. Therefore, damage to the clamping openings may be prevented. It should be noted that all the clamping device described above may be fabricated as an integral unit by forming a suitable elastic synthetic resin.

The side walls 47a and 47b may formed integral. Furthermore, the side walls may be formed integral only with the intermediate member 33 or interconnecting member 32.

What is claimed is:

1. A clamping device for clamping plate-like members comprising
   a. two clamping members having a substantially U-shaped cross sectional configuration;
   b. an interconnecting member interconnecting between said two clamping members comprising two web members rigidly connected to said clamping members, a hinge portion formed between said web members for permitting mutual rotation of said web members, each web member and its rigidly connected clamping member forming a clamping sub-assembly; and
   c. an intermediate member formed integrally with one of said two clamping sub-assemblies and extending toward the other clamping sub-assembly a distance sufficient to contact said other sub-assembly when the closed ends of the U-shaped cross sectional configuration are parallel, thereby preventing further rotation of said extended interconnecting member.

2. A clamping device as set forth in claim 1 wherein said two clamping members, said interconnecting member and said intermediate member are formed integral from a synthetic resin having a suitable elasticity.

3. A clamping device as set forth in claim 1 wherein said two clamping members and said intermediate member are provided with engaging means which engage with each other when said intermediate member is placed between said two clamping members, whereby said intermediate member may be securely held in position.

4. A clamping device as set forth in claim 1 wherein both the upper corners of one side wall of each of said two clamping members are inclined in such a way that the upper side of said one side wall may be shorter than the base or lower side thereof.

5. A clamping device as set forth in claim 1, wherein one side wall of each of said two clamping members is slightly bulged outwardly, whereby the bulged portion may serve as a guide when the clamping device is inserted into clamping openings.

6. A clamping device as set forth in claim 1, wherein said intermediate member is provided with knob means, whereby one may hold and pull said knob means so as to remove said intermediate member out of the position between said two clamping members.

7. A clamping device as set forth in claim 1 wherein side walls are adapted to contact with sides of clamping holes formed through the plate-like members to be clamped together are formed integral with one of said intermediate member and said interconnecting member, said sides of said clamping holes being those at right angles to the sides which contact with the bottoms of said two clamping members.

* * * * *

UNITED STATES PATENT OFFICE
CERTIFICATE OF CORRECTION

Patent No. 4,019,764　　　　　　　　Dated April 26, 1977

Inventor(s) Kouichi Okamura

It is certified that error appears in the above-identified patent and that said Letters Patent are hereby corrected as shown below:

In the Title Page, under "Foreign Application Priority Data":

"49-96369" should be --50-96369--; and the following Japanese Utility Model applications were excluded and should be inserted:

--No. 24095/1975 filed 2/20/75 --
No. 144089/1975 filed 10/21/75--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks